United States Patent [19]

Sebenik et al.

[11] 3,938,969

[45] Feb. 17, 1976

[54] PURIFICATION OF ALUMINUM CHLORIDE

[75] Inventors: Roger Frank Sebenik, 4725 Chastant St., Metairie, La. 70002; Alfred Lippman, 4613 Purdue Drive, Metairie, La. 70003

[73] Assignee: Toth Aluminum Corporation, New Orleans, La.

[22] Filed: Dec. 7, 1973

[21] Appl. No.: 422,846

[52] U.S. Cl. ............................ 55/71; 55/72; 55/84; 423/210; 423/495
[51] Int. Cl.² ..................... B01D 47/00; C01F 7/48
[58] Field of Search ...................... 55/71, 72, 82, 84; 423/135, 215, 463, 495, 210, 465; 75/202, 203

[56] References Cited
UNITED STATES PATENTS

| | | | |
|---|---|---|---|
| 2,533,021 | 12/1950 | Krchma | 55/72 X |
| 3,294,482 | 12/1966 | Lerner | 55/72 X |
| 3,436,211 | 4/1969 | Dewing | 55/72 X |
| 3,786,135 | 1/1974 | King et al. | 55/71 X |

*Primary Examiner*—Charles N. Hart
*Assistant Examiner*—Ferris H. Lander

[57] ABSTRACT

A process for purifying aluminum chloride gas such as that produced in the chlorination of bauxite, clay and other aluminous ores is disclosed. The method first selectively dissolves or liquefies $AlCl_3$ from an anhydrous mixture of gaseous metal chlorides which may also include the chlorides of Si, Ti, Fe and other metals. More specifically, the method of the present invention provides for selectively dissolving $AlCl_3$ vapor at substantially atmospheric pressure without the use of costly or hazardous compressors, or the scraped-wall condensers formerly required for this purpose. In addition, the present method allows for economical recovery of the liquefied $AlCl_3$.

13 Claims, 8 Drawing Figures

PURIFICATION OF ALUMINUM CHLORIDE

BACKGROUND AND SUMMARY OF THE INVENTION

Aluminum chloride is an important chemical which has many industrial applications. For example, it is used as a catalyst in organic chemical syntheses and in petroleum refining. It is also used in dyestuffs and as a nucleating agent for titanium dioxide pigments. In addition, recent technological developments have signaled the potential need for large tonnages of aluminum chloride in processes for the production of aluminum metal. In such processes, an aluminous material is first chlorinated to provide $AlCl_3$, after which the $AlCl_3$ is purified and subsequently reduced by electrolytic or chemical means to give aluminum metal. Such a chemical reduction is effected, for instance, by the Toth Process in which manganese metal is employed to reduce aluminum chloride to give aluminum metal and manganese chloride. The manganese chloride is converted to manganese metal and chlorine which are recycled. The Toth Process is described in the following U.S. Pat. Nos. 3,615,359; 3,615,360; 3,677,742; 3,713,809 and 3,713,811.

In many of these uses of $AlCl_3$, contamination of the $AlCl_3$ with iron chloride and other chlorides is deleterious because of, for example, discoloration in dyeing, the variation of pigment reaction in catalysis and the presence of impurities in aluminum metal.

Current domestic production of $AlCl_3$ is carried out exclusively through direct chlorination of metallic aluminum of high enough purity that purification of the $AlCl_3$ is generally unnecessary. However, methods for production of $AlCl_3$ which employ aluminum metal would obviously not be of use in processes for the production of aluminum. A more economical means for producing aluminum chloride from carbo-chlorination of an aluminous material would be required. Such a process would also be far more economical than production from aluminum, particularly if economical methods were available for purification of the $AlCl_3$. Such materials for chlorination may be high purity but expensive alumina made by the Bayer Process. Alternately, an aluminous ore such as bauxite or clay may be employed, and these materials may be directly carbo-chlorinated following calcination. In the latter case, however, vapors produced during chlorination contain not only $AlCl_3$ but also volatile chlorides of certain impurities commonly present in the ore, such as ferric chloride, titanium tetrachloride, and silicon tetrachloride. For example, a typical analysis of Georgia kaolin clay is given below and each of the listed metallic components would appear as chloride vapors in the product formed during the carbo-chlorination.

| Component | Weight Percent |
|---|---|
| $Al_2O_3$ | 30.0 |
| $SiO_2$ | 50.0 |
| $Fe_2O_3$ | 3.0 |
| $TiO_2$ | 0.6 |
| $H_2O$ | 15.0 |
| Others | 1.4 |
| | 100.0 |

At atmospheric pressure, $AlCl_3$ condenses as a solid, so that conventional methods for obtaining aluminum chloride from mixed chloride vapors formed during the chlorination of calcined ores generally involve an initial condensation of the vapors directly to the solid form. Such condensation may be total condensation, but more likely it involves a fractional condensation of the less volatile aluminum chloride and ferric chloride. Titanium tetrachloride and silicon tetrachloride have significantly higher vapor pressures and consequently are readily separated by condensation at substantially lower temperatures than aluminum chloride and ferric chloride.

Commercially, the solid condensation of aluminum chloride and ferric chloride has been carried out in scraped-surface condensers such as those manufactured by Vogt Machine Co. and the Votator Division of Chemetron Corporation. An example of a commercial application of these condensers to solidify $AlCl_3$ vapors formed during the chlorination of ore is the Alchlor Process of Gulf Refining Co. The process and the condensers are described in an article by A. M. McAfee, "The Manufacture of Commercial Anhydrous Aluminum Chloride", *Ind. and Engr. Chem.*, Vol. 21, No. 7, page 670, and in U.S. Pat. No. 1,814,397. However, scraped-surface condensers are expensive pieces of equipment and require extensive maintenance. Thus capital and operating costs for this method are extremely high.

After solidification of the aluminum chloride and ferric chloride, purified aluminum chloride is obtained by melting the solids under pressure, and by subsequent distillation to provide aluminum chloride of the desired purity. This is also a costly operation because of the high heats of fusion and vaporization of aluminum chloride (116 and 100 BTU/pound respectively) and the inefficiency of melting a solid which has been condensed from the vapor state.

Another method of obtaining purified aluminum chloride is to reduce the ferric chloride contaminant to non-volatile ferrous chloride or iron metal using aluminum metal. The aluminum chloride is then volatilized and condensed. However, this method also requires the melting of the condensed solid aluminum chloride and ferric chloride plus the added expense of the aluminum metal required to react with the ferric chloride to form aluminum chloride and iron metal.

Other prior art methods have employed titanium tetrachloride to preferentially dissolve the solidified aluminum chloride, leaving the ferric chloride in suspension to be filtered or centrifuged away. Although the solubility of aluminum chloride in titanium tetrachloride is relatively low, ferric chloride solubility is negligible with the result that a good separation is obtained. However, large quantities of titanium tetrachloride are required, thus making the recovery of aluminum chloride expensive, especially since the solid condensation of $AlCl_3$ is still necessary.

Another possibility which has not been tried commercially is to compress the mixed chloride vapors, condense these vapors directly to the liquid state, and then proceed with one or more of the previously mentioned methods to obtain purified aluminum chloride. However, because of the high temperatures involved during such compression, and the large scale of the operation that would be required, this would be a very expensive procedure.

SUMMARY

It is an object of the present invention to provide a process which eliminates the disadvantages of known methods of purification involving condensation of aluminum chloride vapors directly to solid form.

The method of the present invention eliminates altogether the need for scraped-surface condensers, as well as the need for melting of the solidified aluminum chloride. Also eliminated are the need for costly high-speed gas turbines or compressors operating under hazardous corrosive conditions. In the present invention, chlorination and subsequent liquefication of the aluminum chloride formed during chlorination are allowed to proceed at atmospheric pressure, without the requirement for large quantities of solvents.

According to the present invention, anhydrous aluminum chloride vapor is selectively dissolved from chloride gases leaving the chlorinator. This is accomplished by a scrubbing solvent at atmospheric pressure. Depending on the solvent selected, the ferric chloride may also be dissolved, in which case the ferric chloride is subsequently separated from the solvent and from the aluminum chloride. If the ferric chloride is not soluble, it will ordinarily solidify to form a slurry, since the temperature of operation will normally be below the melting point of ferric chloride. The solvent is selected such that other chlorides such as $TiCl_4$ and $SiCl_4$ are not soluble or only very sparingly soluble and, as these chlorides have low boiling points, they will leave the absorption apparatus as a vapor. The aluminum chloride which has been selectively dissolved is then separated from the solvent by distillation. The aluminum chloride is separated from the iron chloride by any of various conventional methods, such as fractional rectification, fractional crystallization, filtration, centrifugation, adsorption, absorption, etc.

The solvent in which the aluminum chloride is selectively dissolved should be one which is effective for the intended purpose as well as economically attractive. Thus the solvent should exhibit the following properties: it should have chemical and thermal stability and a volatility which is low with respect to aluminum chloride, ferric chloride, titanium chloride, silicon tetrachloride, and other metal salts which may be present in the reactor product; aluminum chlorides must be readily soluble in the solvent; titanium tetrachloride and silicon tetrachloride must be relatively insoluble; and the absorbed aluminum chloride and ferric chloride should be readily separable from the solvent. The solvent employed is preferably an inorganic fused salt or fused salt mixture such as $NaAlCl_4$, $NaCl - AlCl_3$, $KCl - NaCl - AlCl_3$, $KCl - AlCl_3$, $MoCl_5 - FeCl_3$, $SbCl_3 - AlCl_3$, $AlBr_3$ or $SbCl_3$. The solvent can also be a high boiling organic solvent, preferably a halogenated hydrocarbon or a derivative thereof. The examples given below are illustrative of the type of solvent which is effective in such an operation, but are in no way meant to limit the solvents which may be employed. A preferred solvent will have a melting point not greater than about 130°C. and a boiling point greater than about 250°C, and being mutually soluble with aluminum chloride.

BRIEF DESCRIPTION OF THE DRAWINGS

Referring to the drawings.

DESCRIPTION OF THE PREFERRED EMBODIMENTS

Figure 1:
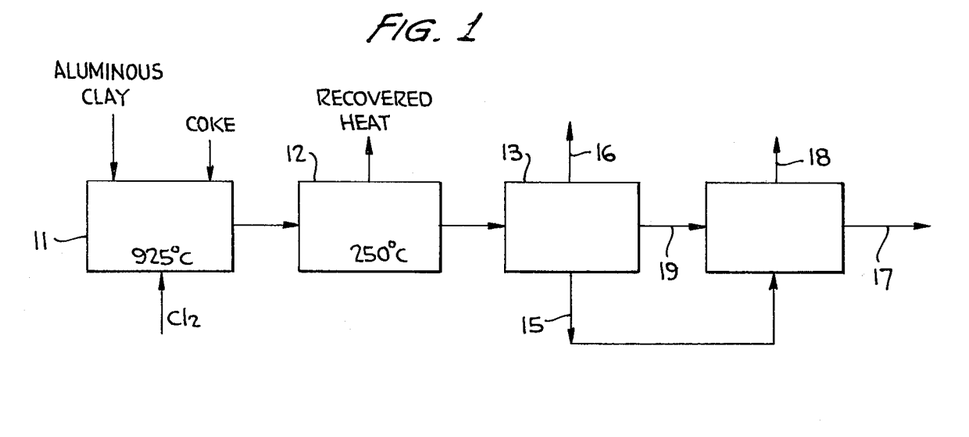
FIG. 1 is a schematic drawing of the general procedure to be followed in carrying out the method of the present invention.

In a general embodiment of this invention, FIG. 1 shows a general block diagram which illustrates the commercial application to dissolve directly and subsequently recover aluminum chloride from a mixed chloride gas stream. In the chlorinator 11 an aluminous material such as Georgian kaolin clay mixed with coke is chlorinated to produce a typical mixed chloride gas stream of the following composition:

| Component | Weight Percent |
|---|---|
| $AlCl_3$ | 42.1 |
| $FeCl_3$ | 3.4 |
| $SiCl_4$ | 37.5 |
| $TiCl_4$ | 0.8 |
| non condensables (i.e., $CO$, $CO_2$, $N_2$) | 16.2 |
| | 100.0 |

The mixed chloride gas stream first enters a cooler 12 to reduce the temperature of gas stream from that of chlorination of about 250°C. The cooler can serve as an excellent waste heat recovery system and enables the cooling of the stream to the minimum temperature allowable (based on dew point) for the chloride vapors entering the absorber. The dew point of the least volatile component ($FeCl_3$) is 239°C. Thus, under normal conditions, approximately 250°C is the lowest temperature at which the mixed chlorides can enter the absorber without the risk of solid condensation.

The mixed chloride gases, now at approximately 250°C, enter the absorber 13 or scrubber where the aluminum chloride in the mixed chlorides is liquefied by preferential absorption into the scrubbing solvent at atmospheric pressure. The ferric chloride is either absorbed into the scrubbing solvent or, if of limited solubility in the solvent, it will solidify to form a slurry. The more volatile chlorides such as titanium tetrachloride and silicon tetrachloride and the noncondensable gases such as $CO$, $CO_2$, and $N_2$ leave the absorber as gases to be separated in other operations which are not pertinent to this invention.

The chloride vapors entering the absorber 13 or scrubber are cooled to remove sensible heat, latent heat of condensation and heat of solution and scrubbed to remove the $AlCl_3$ and $FeCl_3$ components. The absorber 13 is a conventional commercial apparatus used for contacting a liquid and a gas stream continuously. For example, the absorber 13 may be a tower filled with solid packing material, an empty tower into which liquid is sprayed, or a tower containing a number of bubble-cap or sieve plates. It may be a wetted wall column, a stirred vessel or other mechanically aided device. Ordinarily the gas and liquid streams flow countercurrently through the absorber 13 in order to obtain the greatest rate of absorption, although this is not required. Adequate contact of the mixed chloride vapors with the liquid solvent must be obtained with removal of heat of condensation and sensible heat sufficient to prevent an excessive temperature of the solvent.

The liquid 15 leaving the scrubber 13 and entering the recovery system 14 is enriched in $AlCl_3$ and $FeCl_3$, whereas the gases 16 leaving the scrubber 13 are saturated with the solvent which, if desired, can be recovered by cooling and condensation and returned to the absorber 13. The function of the recovery system 14 is to reclaim the solvent for recycle to the scrubber 13 by stream 19, and to obtain purified $AlCl_3$ ($FeCl_3$-free) as a liquid 17 in one of the aforementioned procedures with $FeCl_3$ being recovered as a separate component 18. In the examples given below, distillation has been used to separate pure $AlCl_3$, with crystallization or filtration being employed to separate the $FeCl_3$. Distillation is generally carried out by heating the $AlCl_3$-containing solvent to a temperature of about 180° to 250°C, depending upon the pressure employed. Distillation at pressures of at least 3 atmospheres is desirable for reasons to be discussed below.

The following examples are illustrative of the method of the present invention but are not intended to limit the scope thereof.

EXAMPLE 1

Figure 2:
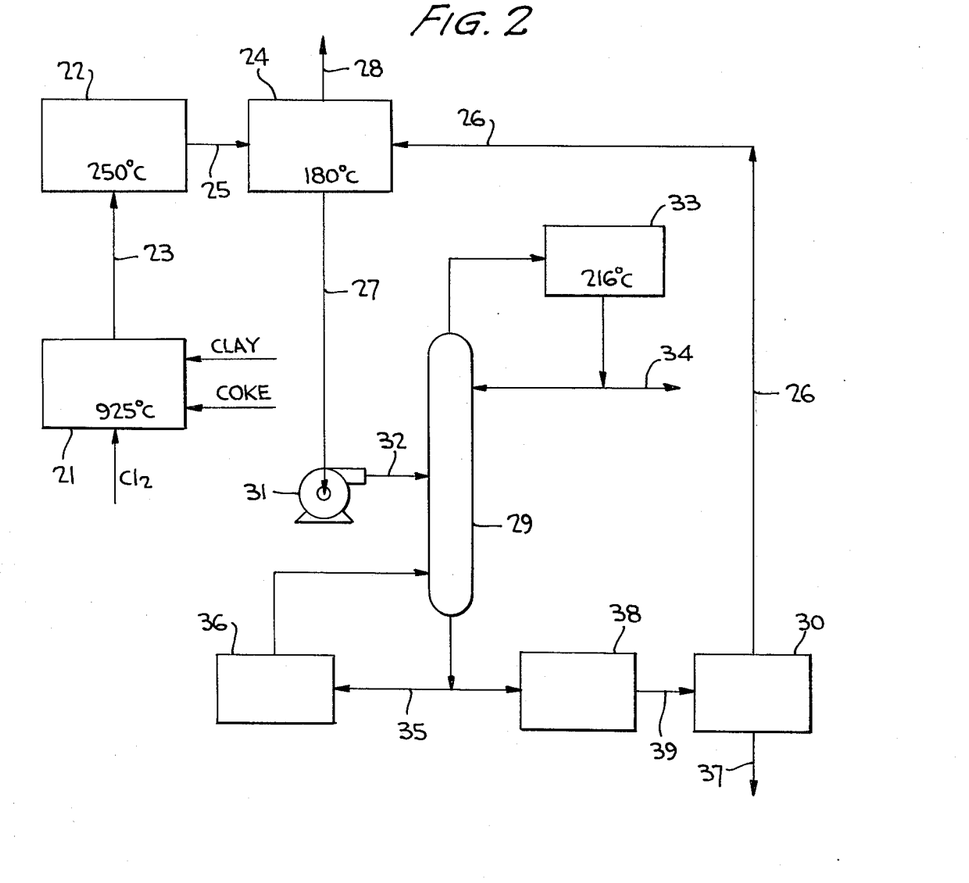
FIG. 2 is a schematic drawing of a first embodiment of the method of the present invention.

In the embodiment of the present invention as shown in FIG. 2, a process flow diagram is provided of a procedure in which a binary liquid mixture of molybdenum pentachloride and ferric chloride is used to liquefy $AlCl_3$ at atmospheric pressure. The flow diagram also shows how the $AlCl_3$ is economically recovered and the $MoCl_5$—$FeCl_3$ solvent recycled. In this example, a solvent composition containing 40 wt. % ferric chloride and 60 wt. % molybdenum pentachloride is employed.

In FIG. 2 the raw clay is chlorinated in a reactor 21 and transported to a cooler 22 via stream 23 for cooling to 250°C as discussed previously. In this process, the mixed chlorides 23 leave the chlorinator 21 to be cooled in cooler 22 and then enter the absorber 24 as a vapor 25. In the absorber 24, the mixed chloride stream 25 containing $AlCl_3$ and $FeCl_3$ from the cooler 22 is liquefied at 250°C by the liquid solvent 26 containing 40 wt. % $FeCl_3$ and 60 wt. % $MoCl_5$. The $FeCl_3$—$MoCl_5$ liquid solvent 26 enters the absorber 24 at about 88°C and the liquid 27, following absorption of $AlCl_3$ and $FeCl_3$, leaves the absorber 24 as a ternary mixture of $AlCl_3$, $FeCl_3$, and $MoCl_5$ at 180°C.

Figure 3:
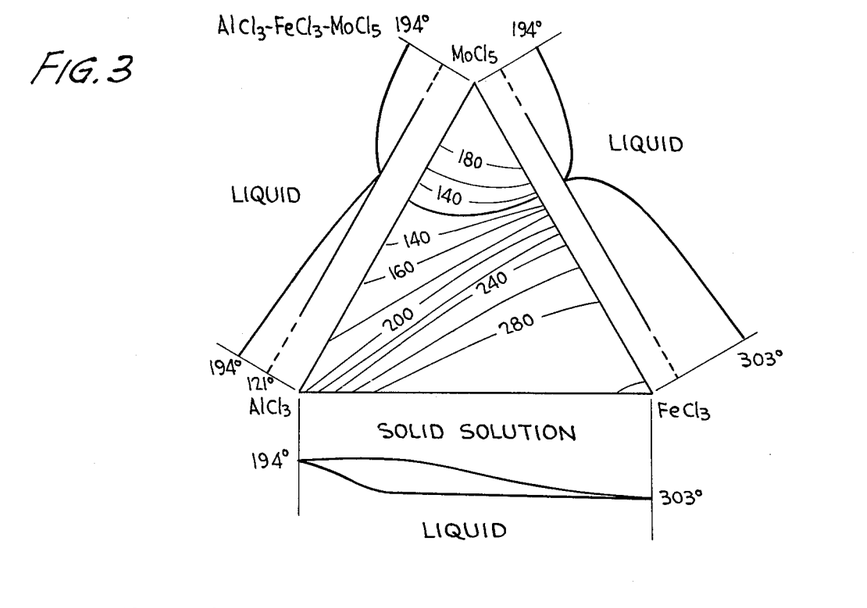
FIGS. 3 and 4 show phase diagrams for various solvents employed in the present invention.

The composition of the liquid 27 leaving the absorber 24 is determined by the composition of the mixed chloride stream 25 entering the absorber 24, the composition of the solvent 26 entering the absorber 24, and the ternary phase diagram for the system $AlCl_3$—$FeCl_3$—$MoCl_5$. This phase diagram is shown in FIG. 3. Conventional material balance calculations using the mixed chloride compositions leaving the chlorinator as described in connection with FIG. 1, a 40% $FeCl_3$—60% $MoCl_5$ composition of the solvent 26, and the phase diagram of FIG. 3 will result in the following liquid composition leaving the absorber 24 via stream 27: 40 wt. % $AlCl_3$, 35 wt. % $MoCl_5$ and 25 wt. % $FeCl_3$.

The other components of the mixed chlorides entering the absorber 24 via stream 25 leave as a vapor 28. These are the volatile chlorides such as $TiCl_4$ and $SiCl_4$ plus non-condensable gases such as $CO$, $CO_2$ and $N_2$.

The recovery system used with a $FeCl_3$—$MoCl_5$ solvent requires fractional distillation and fractional crystallization. The liquid leaving the absorber 24 via stream 27 is compressed by pump 31 to 4 atmospheres pressure and fed via stream 32 to a distillation column 29.

Figure 4:
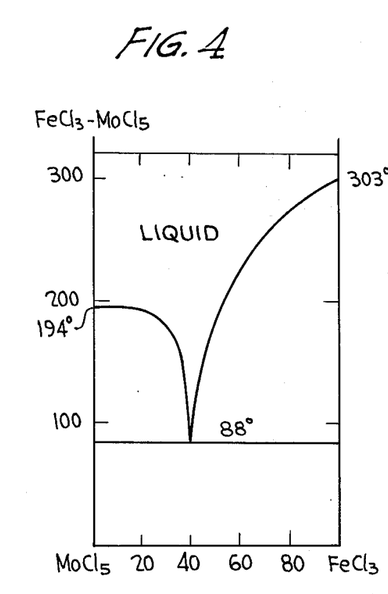

In order to separate and recover purified aluminum chloride as a liquid it is necessary to use pressures in excess of atmospheric because pure aluminum chloride does not exist as a liquid at atmospheric pressure. Aluminum chloride, at atmospheric pressure, sublimes because its normal boiling point, 181°C, is lower than its melting point, 190°C. However, at 4 atmospheres pressure, aluminum chloride boils at 216°C. Consequently it will exist as a pure liquid at temperatures between 190° and 216°C. Thus a minimum pressure of 3 atmospheres is desired for this purpose, with 4 atmospheres pressure being preferred. Thus a distillation column operating at 4 atmospheres pressure (44 psig) will rectify pure aluminum chloride from the less volatile molybdenum pentachloride and ferric chloride components. Distillation at 4 atmospheres pressure results in the condensation in condenser 33 of purified liquid aluminum chloride 34 at 216°C, and a bottoms product 35 from the reboiler 36 having a composition of 43% $FeCl_3$ and 57% $MoCl_5$ at 300°C. The bottoms 35 have been enriched in $FeCl_3$ by the $FeCl_3$ present in the mixed chlorides 25. The excess, or by-product, ferric chloride 37 is removed by cooling stream 35 to 88°C in cooler 38 and then passing the liquid 39 to a continuous crystallizer 30 to form ferric chloride crystals 37 at 88°C. The binary phase diagram for the $FeCl_3$—$MoCl_5$ system shown in FIG. 4 indicates that the liquid in equilibrium with solid ferric chloride is an eutectic composition of 40% $FeCl_3$ — 60% $MoCl_5$. This liquid 26 is recycled to the absorber 24.

This method has the advantage of separating the $FeCl_3$ from the $AlCl_3$ as a solid material by crystallization and filtration.

It should be noted that other alternative methods to recover aluminum chloride from the unique ternary mixture 27 are also available. For example, boiling the mixture at atmopheric pressure would yield the more volatile aluminum chloride as a vapor from which it could be condensed as a solid. This latter method would not, however, be as advantageous as the method described above.

EXAMPLE 2

Figure 5:
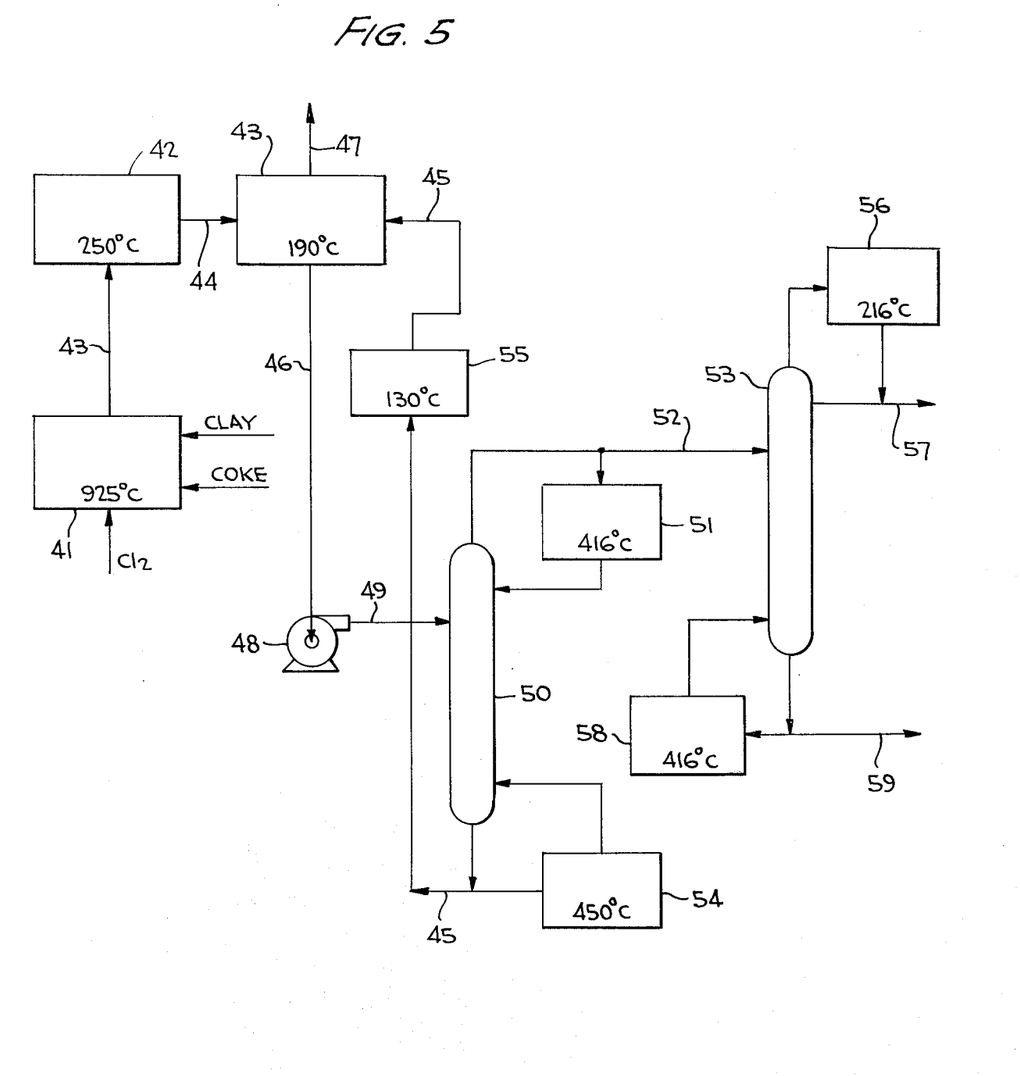
FIG. 5 is a schematic drawing of a second embodiment of the method of the present invention.

In FIG. 5 there is shown a flow diagram of a process which employs a binary liquid mixture of sodium chloride and aluminum chloride to dissolve or liquefy $AlCl_3$ at atmospheric pressure. The $AlCl_3$ is then recovered as a pure component and the $NaCl$ — $AlCl_3$ solvent is recycled. In this example, a solvent composition containing 79 wt. % $AlCl_3$ and 21 wt. % $NaCl$ is employed. However, other compositions of these two components would also be suitable. For example, $NaAlCl_4$ which is a 50–50 mole mixture of $NaCl$ and $AlCl_3$ (70 wt. % $AlCl_3$) and also a stable compound, would make a suitable solvent.

Figure 6:
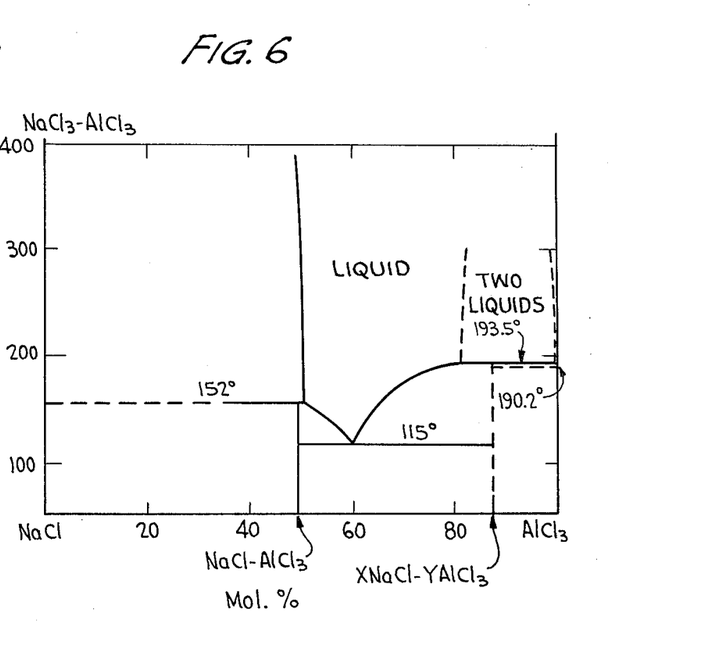
FIG. 6 shows a phase diagram for a solvent employed in the present invention.

As in Example 1 the raw clay is chlorinated in a reactor 41 and transported to a cooler 42 via stream 43 which is cooled to 250°C before entering the absorber 43 as a vapor via stream 44. In the absorber 43 the mixed chloride vapors 44 at 250°C are contacted by the liquid NaCl — AlCl$_3$ solvent 45 at 130°C. The solvent 45 preferentially liquefies the AlCl$_3$ and FeCl$_3$ from the mixed chlorides, resulting in a ternary liquid mixture 46 of AlCl$_3$, FeCl$_3$, and NaCl. Based on conventional material balance calculations and the phase diagram of FIG. 6, the composition of the liquid 46 leaving the absorber 43 is 83% AlCl$_3$, 2% FeCl$_3$ and 15% NaCl at 190°C. As in Example 1, the volatile chlorides and non-condensable gases leave the absorber 43 as vapor via stream 47.

The recovery system for separating the AlCl$_3$ and FeCl$_3$ which have been liquefied by the NaCl — AlCl$_3$ solvent requires two distillation steps. These steps are also shown in FIG. 5. Both distillations are conducted at 4 atmospheres pressure (44 psig) so that, as explained in Example 1, aluminum chloride will exist as a liquid. Thus the liquid leaving the absorber 43 via stream 46 is compressed by pump 48 to 4 atmospheres pressure and fed via stream 49 to distillation column 50.

Distillation in column 50 results in the volatilization of the AlCl$_3$ and FeCl$_3$ absorbed from the mixed chloride stream 44. These are partially condensed in condenser 51 but the total gas-liquid stream 52 is sent to a second distillation column 53 for separation. The volatilization of AlCl$_3$ and FeCl$_3$ in column 50 is controlled by the temperature of reboiler 54. A reboiler temperature of 450°C will maintain a bottoms via stream 45 composition of 79 wt. % AlCl$_3$, 21 wt. % NaCl for recycle through cooler 55 to the absorber 43.

The binary AlCl$_3$ — FeCl$_3$ mixture 52 is then separated in a second distillation column 53 at 4 atmospheres pressure. A condenser 56 operating at 216°C gives the purified aluminum chloride 57. Similarly the reboiler 58 operating at 416°C gives the by-product ferric chloride 59.

EXAMPLE 3

Figure 7:
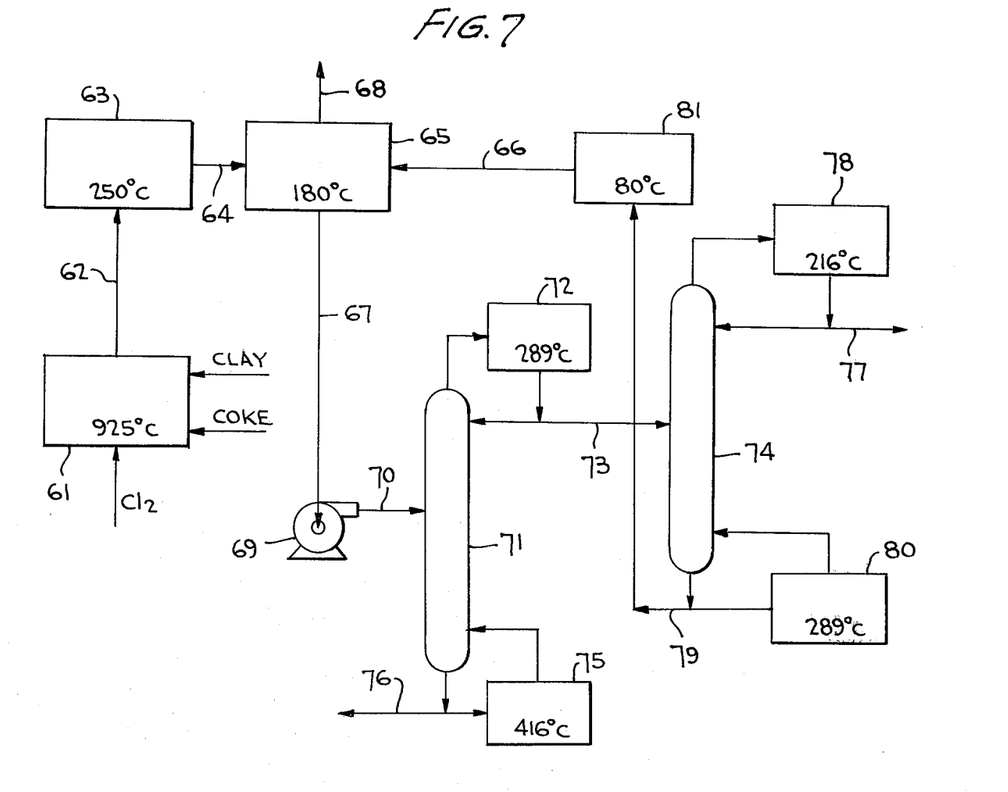
FIG. 7 is a schematic drawing of a third embodiment of the method of the present invention.

FIG. 7 shows a flow diagram of a process which employs a pure component solvent, antimony trichloride, to liquefy AlCl$_3$ at atmospheric pressure. As in previous examples the purified AlCl$_3$ is recovered by distillation and the SbCl$_3$ solvent is recycled following distillation. It should be noted that the scope of antimony chloride as an absorption solvent is not limited to applications as a pure component.

Figure 8:
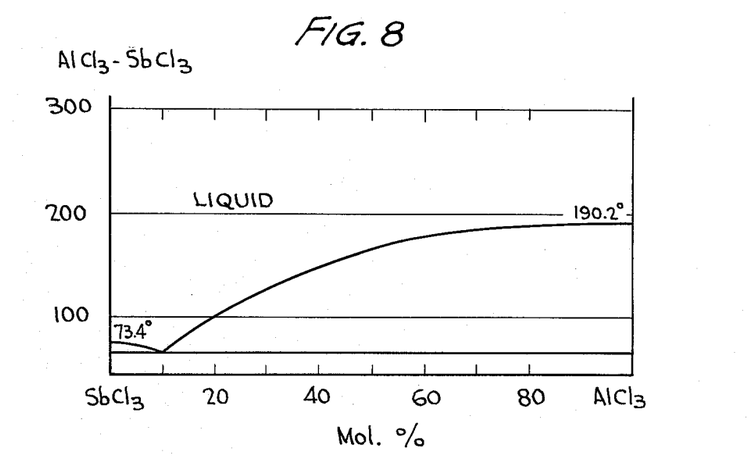
FIG. 8 shows a phase diagram for a solvent employed in the present invention.

In FIG. 7 the raw clay is carbo-chlorinated in the chlorinator 61 to produce a mixed chloride gas stream 62. The composition of the gases has been previously discussed with respect to FIG. 1. Following a cooling step in cooler 63 the mixed chloride gases 64 enter the absorber 65 at 250°C where they are countercurrently contacted with liquid antimony trichloride 66 at 80°C. The antimony trichloride 66 preferentially liquefies the aluminum chloride and ferric chloride from the mixed chlorides 64 resulting in a ternary liquid mixture 67 of AlCl$_3$, FeCl$_3$, and SbCl$_3$ at 180°C. Using standard material balance calculations and the phase diagram shown in FIG. 8, the composition of the liquid 67 leaving the absorber 65 is 28 wt. % AlCl$_3$, 2 wt. % FeCl$_3$, and 70 wt. % SbCl$_3$. As in previous examples the volatile chlorides and non-condensable gases leave the absorber 65 as vapor 68.

The recovery system to separate the aluminum chloride and ferric chloride from the antimony trichloride requires two distillation steps which are conducted at 4 atmospheres pressure (44 psig). Thus the liquid leaving the absorber 65 via stream 67 is compressed by a pump 69 and fed via stream 70 at 4 atmospheres pressure to a distillation column 71.

Distillation in column 71 results in the volatilization of AlCl$_3$ and SbCl$_3$ from FeCl$_3$. These are condensed at 289°C in a condenser 72, with the liquid condensate 73 containing 28 wt. % AlCl$_3$ and 72 wt. % SbCl$_3$ being fed to a second column 74. The bottoms 76 from column 71, which are taken-off at a reboiler 75, are liquid at 416°C.

In column 74, aluminum chloride and antimony chloride are separated at 44 psig. Liquid aluminum chloride 77 is recovered from the condenser 78 at 216°C while antimony chloride 79 for recycle is recovered from the reboiler 80 at 289°C. Following cooling in cooler 81 to 80°C, the antimony trichloride liquid is fed to the absorber 65 via stream 66.

EXAMPLE 4

A non-chloride chemical which is a suitable solvent to liquefy aluminum chloride is aluminum tribromide. It can be used as a pure component or mixed with another component such as, for example, aluminum chloride. In this example a 40 wt. % aluminum chloride, 60 wt. % aluminum bromide mixture is fed to the absorber as liquid at 80°C. Recovery of the aluminum chloride, ferric chloride, and aluminum bromide for recycle using distillation is similar to the procedure set forth in the previous examples.

It is claimed:

1. A method for recovering aluminum chloride from a mixed chloride gas containing aluminum chloride and at least one chloride selected from the group consisting essentially of FeCl$_3$, TiCl$_4$ and SiCl$_4$ which comprises contacting said mixed chloride gas at atmospheric pressure with a liquid solvent in which aluminum chloride is soluble to dissolve the aluminum chloride, and recovering the aluminum chloride from the solvent by distilling the aluminum chloride from the solvent at a pressure sufficient to condense the aluminum chloride as a liquid.

2. The method of claim 1 wherein the solvent has a melting point not greater than about 130°C, a boiling point greater than about 250°C and is mutually soluble with aluminum chloride.

3. The method of claim 1 wherein the liquid solvent is selected from the group of inorganic fused salts and fused salt mixtures consisting of NaAlCl$_4$, NaCl—AlCl$_3$, KCl—NaCl—AlCl$_3$, KCl—AlCl$_3$, MoCl$_5$—FeCl$_3$, SbCl$_3$—AlCl$_3$, AlBr$_3$ and SbCl$_3$.

4. The method of claim 1 wherein the contacting of said mixed chloride gas and said liquid solvent is carried out at a temperature of from about 70° to 250°C.

5. The method of claim 1 wherein the aluminum chloride is recovered from the solvent by distillation at a pressure of at least 3 atmospheres.

6. The method of claim 1 wherein ferric chloride is present in said mixed chloride gas and is co-liquefied along with aluminum chloride.

7. The method of claim 1 wherein ferric chloride is present in said mixed chloride gas and is condensed as a solid in said solvent and separated from said solvent.

8. The method of claim 1 wherein the solvent is a binary mixture of MoCl$_5$ and FeCl$_3$.

9. The method of claim 1 wherein the solvent is a binary mixture of NaCl and AlCl$_3$.

10. The method of claim 1 wherein the solvent is a binary mixture of SbCl$_3$ and AlCl$_3$.

11. The method of claim 1 wherein the solvent is SbCl$_3$.

12. The method of claim 1 wherein the solvent is AlBr$_3$.

13. The method of claim 7 wherein the ferric chloride is separated from the solvent by fractional crystallization.

\* \* \* \* \*

UNITED STATES PATENT OFFICE
CERTIFICATE OF CORRECTION

Patent No. 3,938,969          Dated February 17, 1976

Inventor(s) Roger Frank Sebenik et al.          Page 1 of 2

It is certified that error appears in the above-identified patent and that said Letters Patent are hereby corrected as shown below:

Figures 1 and 2, should appear as shown on the attached sheet.

Signed and Sealed this

Twenty-fifth Day of January 1977

[SEAL]

Attest:

RUTH C. MASON
*Attesting Officer*

C. MARSHALL DANN
*Commissioner of Patents and Trademarks*

FIG. 1

FIG. 2